United States Patent [19]
von Herrmann et al.

[11] Patent Number: 5,323,752
[45] Date of Patent: Jun. 28, 1994

[54] UTILIZATION SYSTEM FOR GASEOUS FUEL POWERED VEHICLES

[75] Inventors: Pieter J. von Herrmann, Shaker Heights; Orhan Talu, Richmond Heights, both of Ohio

[73] Assignee: Cleveland State University, Cleveland, Ohio

[21] Appl. No.: 74,481

[22] Filed: Jun. 11, 1993

[51] Int. Cl.⁵ ............................................. F02M 21/04
[52] U.S. Cl. ..................... 123/527; 123/DIG. 12
[58] Field of Search ....... 123/525, 526, 527, DIG. 12; 220/901, 4.14

[56] References Cited

U.S. PATENT DOCUMENTS

| | | | |
|---|---|---|---|
| 4,495,900 | 1/1985 | Stockmeyer | 123/527 |
| 4,522,159 | 6/1985 | Engel et al. | 123/527 |
| 4,523,548 | 6/1985 | Engel et al. | 123/527 |
| 4,531,558 | 7/1985 | Engel et al. | 123/525 |
| 4,548,044 | 10/1985 | Sakai | 123/DIG. 12 |
| 4,570,446 | 2/1986 | Matsubara | 123/DIG. 12 |
| 4,749,384 | 6/1988 | Nowobilski | 123/527 |
| 4,817,684 | 4/1989 | Turko et al. | 141/4 |
| 4,887,556 | 12/1989 | Gladstone | 123/DIG. 12 |
| 5,082,048 | 1/1992 | Iwaki et al. | 123/DIG. 12 |

*Primary Examiner*—E. Rollins Cross
*Assistant Examiner*—Erick Solis
*Attorney, Agent, or Firm*—John F. McDevitt

[57] ABSTRACT

An improved on-board storage and use system employing a gaseous hydrocarbon fuel to power internal combustion engine vehicles is disclosed. Storage of the fuel by sorption in a plurality of storage vessels at above atmospheric pressure enables subsequent removal for use during vehicle operation to include using an air stream in a particular manner for greater fuel recovery.

20 Claims, 2 Drawing Sheets

UTILIZATION SYSTEM FOR GASEOUS FUEL POWERED VEHICLES

BACKGROUND OF THE INVENTION

This invention relates generally to a system for improved utilization of a gaseous hydrocarbon fuel when stored in pressurized vessels aboard internal combustion engine vehicles and more particularly to a utilization system whereby the gaseous hydrocarbon fuel is first sorbed in storage vessels employing sorptive materials and thereafter more effectively recovered therefrom for use during vehicle operation.

The development and use of various gaseous hydrocarbon fuels to supply the motive power for internal combustion engine vehicles has been underway for a considerable time period. A greater interest is developing in such use of gaseous hydrocarbon fuels including natural gas, methane, propane, butane and the like, to replace conventional liquid petroleum vehicle fuels such as gasoline or diesel fuel by reason of dwindling reserves for the liquid petroleum fuels as well as adverse effects of vehicle emissions when liquid petroleum fuels are employed. The already developed vehicle utilization systems employing an on-board and self-contained supply of such gaseous hydrocarbon fuels store the fuel under pressure in one of two general ways. In a very high pressure utilization system, the gaseous fuel is stored on-board at pressures in the approximate range 2000–3000 psi which requires quite expensive storage vessels and refueling equipment. It has also been previously found that a use of on-board fuel storage vessels containing sorptive materials permits storage of such fuels at relatively low pressures up to approximately 600 psi. In accordance therewith, various types sorptive materials such as zeolites, activated carbon and silicon gels have been utilized to increase the storage capacity of on-board vehicle systems employing such gaseous hydrocarbon fuels. While it has also been previously found that these gaseous hydrocarbons can be stored on-board the vehicles in a liquid state at or near atmospheric pressure, such liquified gas storage is reported to require comparatively expensive cryogenic equipment both on-board the vehicle and in the refueling system.

In U.S. Pat. No. 4,522,159 there is disclosed a utilization system for gaseous hydrocarbon fuel powered vehicles which stores the fuel on-board at relatively low pressures up to approximately 500 psig using sorptive storage means. The disclosed vehicle utilization system comprises means for on-board storage of a self-contained supply of the gaseous hydrocarbon fuel, a prime mover, means for conveying the gaseous hydrocarbon fuel to and from the on-board storing means and means for controlling the pressure of the gaseous hydrocarbon fuel from the on-board storing means to the prime mover. The on-board storing means is said to include one or more vessels or cylinders, containing a predetermined sorbent material for allowing a given amount of the gaseous hydrocarbon fuel to be stored at such lower pressure. The prime mover such as an internal combustion engine includes means for combining the gaseous hydrocarbon fuel with air to produce the mechanical energy therefrom necessary to move the vehicle. The conveying means is reported to be adapted so as to convey the gaseous hydrocarbon fuel to the on-board storing means from a stationary refueling apparatus, and also to convey the gaseous hydrocarbon fuel from the on-board storing means to the combining means of the prime mover during operation of the vehicle. In the preferred embodiment, the maximum pressure at which the gaseous hydrocarbon fuel is stored in the on-board storing means is the range of approximately 100 psig to approximately 400 psig. As furthermore particularly disclosed therein, the preferred embodiment provides the desorbed fuel in a separate manner to the engine carburetor means for combination thereat with an air supply.

A similar type low-pressure system for the utilization of a gaseous hydrocarbon to power automotive type vehicles is also disclosed in U.S. Pat. No. 4,523,548. Multiple cylinders are employed containing either adsorbent or absorbent material including molecular sieves, activated carbon zeolite compounds, various clays and silicate gel which store the hydrocarbon gas at pressures ranging from approximately 100 psig to approximately 400 psig. The gas is filtered before storage with sorptive filtering means to remove undesirable constituents such as odorant additives (dimethylsulfide and the like) which are frequently included in natural gas as a safety measure. The reported purpose (column 14, lines 19–22) for removing such constituents is further said to be maximizing the capability of the storage vessels to sorb the lighter hydrocarbons such as methane. A still different storage system for gaseous hydrocarbon fuels is disclosed in U.S. Pat. No. 4,817,684. An illustrated mixture of methane containing an additive such as dimethylsulfide, tetrahydrothiothene (THT), tertiary butyl mercaptan (TBM) and others is adsorbed at elevated pressures within the storage vessel containing a bed of solid adsorbent particles which has been preconditioned at a lower pressure with the additive. Storage of the gas mixture within the storage vessel is said to proceed in accordance with isothermal curves depicted in FIG. 2 of said prior art reference (column 5, lines 26–32).

In all of the above referenced prior art types sorptive utilization systems, a considerable amount of the sorbed gas will be left on the solid sorptive medium (contained in the cylinder or other type storage vessel) after the depletion at atmospheric pressure is reached. As high as fifty (50%) percent of the sorbed gas contained in the storage vessel at charge can be retained in the sorption bed at depletion depending upon the particular sorbable gas and solid sorption medium being employed. The sorbed gas left after depletion is not usable in any normal storage application since it will require a vacuum application to remove it. Accordingly, there still remains a serious need for better means to desorb more of the stored gas at atmospheric conditions of pressure and temperature.

It is therefore an object of the present invention to provide more effective means of utilizing the stored fuel of an on-board gaseous hydrocarbon fuel powered vehicle system.

It is another object of the present invention to increase the capacity of an on-board gaseous hydrocarbon fuel powered vehicle system by recovering more of the stored fuel.

It is a still further object of the present invention to provide more effective means for the operation of a gaseous hydrocarbon powered vehicle system having the gaseous hydrocarbon fuel stored on-board under pressure in a suitable sorptive medium so that more of the stored fuel becomes available for use when pressure is reduced upon the stored fuel to substantially atmospheric pressure.

Still another object of the present invention is to provide an improved method for the operation of internal combustion engine vehicles employing a gaseous hydrocarbon as the motive fuel.

These and other objects as well as advantages of the present invention will become more apparent from the following detailed description being provided upon the preferred embodiments,

SUMMARY OF THE INVENTION

It has now been discovered, surprisingly, that a gaseous hydrocarbon fuel stored on board an internal combustion engine vehicle in a plurality of storage vessels whereby the fuel has been sorbed at above atmospheric pressure can be more effectively recovered. In doing so, the present vehicle storage means comprises a plurality of operatively associated storage vessels, such as cylinders, in which the gaseous hydrocarbon fuel is sorbed at above atmospheric pressure up to about 600 psi in the sorbent material for subsequent desorption in a particular manner. Improved fuel desorption is provided in the present utilization system by causing the particular storage vessel being exhausted of fuel to become further subjected to a moving air stream after the internal gas pressure therein has been reduced to substantially ambient pressure. Operating the present utilization system in such manner will reduce the partial pressure of the still stored fuel sufficiently so that additional fuel becomes desorbed for discharge in the air stream emerging from applicable storage vessel. Accordingly, the storage capacity of the present on-board utilization system has been increased through such manner of operation since the storage capacity is proportional to the difference between whatever amount of the gaseous fuel is initially stored and the amount still remaining stored at the reduced pressure. It also follows in accordance with such mode of operation for the present utilization system that a premixture of fuel and air will be supplied to the vehicle engine.

Basically, the essential components of the presently improved utilization system comprise:

(a) vehicle storage means comprising a plurality of storage vessels in which the gaseous hydrocarbon fuel is sorbed at above atmospheric pressure in a sorbent material, each of the storage vessels including separate air and fuel passage means, (b) manifold means to receive fuel from the individual storage vessels while also conveying a mixture of fuel and air to the vehicle engine, the manifold means further including means to adjust the proportions of fuel and air in the conveyed mixture, (c) first conduit means supplying air to the manifold means during vehicle operation, the first conduit means including adjustable valve means to regulate the air volume supplied thereto, (d) second conduit means interconnecting the first conduit means and the air passage means provided to each storage vessel, the second conduit means including valve means enabling admission of air to each storage vessel when the internal gas pressure has been reduced by fuel removal therefrom to substantially ambient pressure, and (e) third conduit means interconnecting the fuel passage means of each storage vessel and the manifold means, the third conduit means also including valve means enabling fuel removal from each storage vessel. The present utilization system can further be constructed to employ existing equipment means such as disclosed in the above referenced prior art patents, to include the storage vessels, manifold means as well as the conduit means and the like while also further including such valving means disclosed therein such as pressure regulators, check valves, shut-off valves, and three-way valves together with still further conventional flash-back protection means. As will be further apparent to those having ordinary skill in the applicable internal combustion engine vehicle art, the present utilization system enables vehicle operation at various already known combustion ratios of fuel to air as well as various compression ratios for the particular vehicle engine being employed.

Improved operation with respect to an individual storage vessel in the present utilization system proceeds according to a sequence whereby fuel is initially removed from the selected vessel during vehicle operation for combination with air being supplied to the vehicle engine as a premixture and with a subsequent air stream being admitted to said storage vessel when the internal gas pressure has been reduced by fuel removal therefrom to a substantially ambient pressure level. Adjustment of the fuel and air proportions in the premixture being supplied to the vehicle engine is regulated in the present utilization system with conventional pressure sensitive proportional control valve means. Similar control valve regulation can be employed to the air and fuel mixture ultimately emerging from each storage vessel during use to further include having such mixture combined with the initially supplied premixture.

DETAILED DESCRIPTION OF THE PREFERRED EMBODIMENTS

Figure 1:
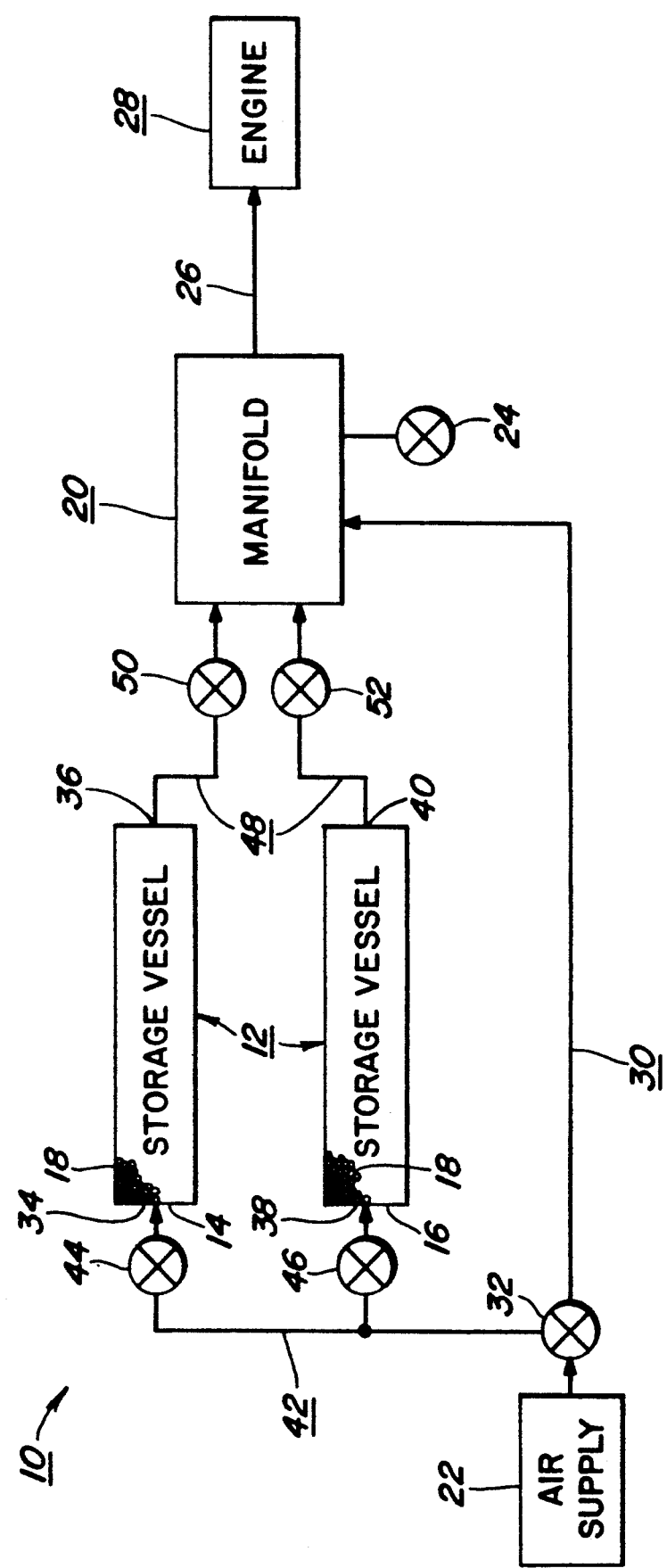
FIG. 1 is a schematic flow diagram for a representative gaseous hydrocarbon vehicle storage and power plant system according to the present invention.

Referring to the drawings, FIG. 1 is a schematic view depicting a representative utilization system 10 for internal combustion engine vehicles employing a gaseous hydrocarbon as the motive fuel. The depicted system 10 employs vehicle storage means 12 in the form of operatively associated storage vessels 14 and 16 having the gaseous hydrocarbon fuel sorbed therein at above atmospheric pressure in suitable sorbent material 18. While the selected gaseous hydrocarbon selected in the present embodiment can be methane or natural gas, still other gaseous fuels such as propane and butane can also be used. It can also be appreciated that while the depicted storage means employs but a pair of storage vessels such as cylinders and the like that other known vehicle storage systems have as many as twenty cylinders or more which are operated in a cooperative manner. The depicted utilization system further includes manifold means 20 to receive fuel from the individual storage vessels 14 and 16 while also being supplied with air from a suitable supply source 22. Pump means are not included as an essential component for delivery of said air supply in the depicted embodiment since otherwise conventional manifold construction now often enables delivery of such air supply under vacuum conditions. The depicted manifold means further includes pressure sensitive proportional control valve means 24 which regulates the proportion of fuel and air in a premixture being transferred therefrom by conduit means 26 to the vehicle engine 28. First conduit means 30 in the depicted embodiment supplies air to the manifold means 20 from its supply source 22 under regulation of additional pressure sensitive proportional control valve means 32. Cooperation between valve components 24 and 32 enables the air and fuel premixture being supplied to engine 28 via conduit 26 be regulated as to the volume requirements of engine demand. Storage vessel 14 includes an entrance passageway or opening 34 enabling air passage thereto together with a separate exit passageway or opening 36 from which the stored hydrocarbon fuel is removed. Correspondingly, storage vessel 16 includes air passageway 38 along with fuel passageway 40. Second conduit means 42 interconnects first conduit means 30 with the air passageway means (34 and 38) to both storage vessels. Conventional fast response open and close type valve means 44 and 46 are incorporated in second conduit means 42 for air admission when actuated to an individual storage vessel. Third conduit means 48 interconnects the fuel passage means of each storage vessel with the manifold means 20. Fast response open and close type valve means 50 and 52 are also incorporated in conduit means 48 to enable the removal of stored fuel from an individual storage vessel. While not shown in the depicted embodiment, valve means 50 and 52 could also be of the reversible type for admission of additional fuel to the individual storage vessels after being depleted of the originally stored fuel. For refilling of the storage vessels in such manner as already disclosed in the previously referenced prior art patents, the manifold means in the present embodiment would further require that fuel inlet means and pressure reduction means be provided.

During vehicle operation, sequential actuation of the valve means for the depicted embodiment enables increased fuel recovery from the individual storage vessels. More particularly, such vehicle operation can commence with storage vessel 14 being employed to provide fuel in the fuel and air premixture supplying vehicle motive power. During such mode of operation, valve means 44, 46 and 52 remain closed while valve means 50 is open to supply fuel to manifold means 20. Control valve means 24 and 32 also operate at this time to provide air to the manifold means for said fuel and air premixture at predetermined proportions for the particular demand volume. Upon reducing the fuel pressure in storage vessel 14 to substantially ambient pressure, valve means 46 and 52 remain closed while valve means 44 is opened admitting air to said storage vessel while control valve means 32 continues to regulate air being supplied to the manifold means. Air continues to flow through storage vessel 14 for passage to the manifold means as a mixture containing additionally recovered fuel. When the additionally recovered fuel and air mixture contains only minimal fuel proportions, valve means 44 and 50 are then closed with valve means 46 remaining closed and valve means 52 now being opened to supply fuel from storage vessel 16 to the manifold means. Upon reducing fuel pressure in storage vessel 16 to substantially ambient pressures, valve means 46 is now opened for air admission to said storage vessel while control valve means 24 and 32 continue to operate regulating the fuel and air premixture being supplied to the vehicle engine. System operation of the depicted embodiment continues in the latter manner with termination occurring when the additionally recovered fuel and air mixture from storage vessel 16 again is found to contain only minimal fuel proportions.

Figure 2:
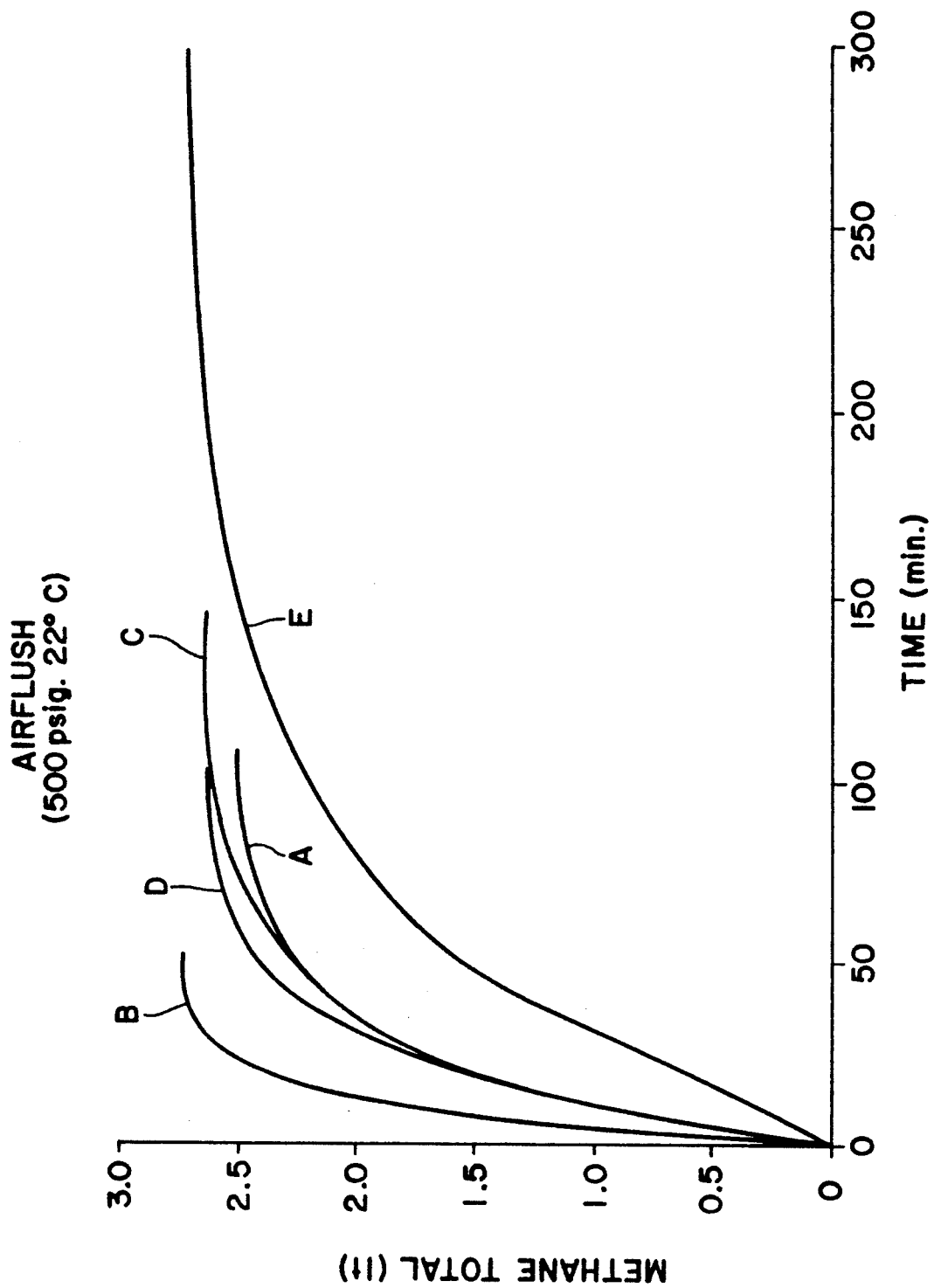
FIG. 2 is a graph depicting desorption of methane fuel with an air flush being supplied to the storage vessel as a function of time.

To confirm the effectiveness of the present utilization system in recovering more of the stored fuel, laboratory tests were conducted employing an air flush to remove residual methane stored in a column packed with Sutcliff carbon. The storage volume of said laboratory equipment measured 147.37 cc with the packing weighing 83.66 gms to produce a packing density of 0.568 gms/cc. The column length measured 50.9 cm. with an internal diameter measuring 1.92 cm. The test procedure consisted of a preliminary activation of the packed storage volume to 200° C. followed by evacuating the storage volume to vacuum conditions before initiating the test runs. Each of the test runs followed an initial sequence as follows: (a) methane was pumped into the packed column until a column pressure of 500 psig was reached, (b) while still connected to the methane source the column temperature returned to ambient since methane adsorption raised the column temperature, (c) the methane source valve was then closed while opening the column exit valve with methane discharge rates being controlled until the column pressure reduced to ambient pressure. At such time, the total methane volume discharged was measured with initial desorption performance (V/V) thereby becoming known. To determine a further recovery of methane with an air flush following said initial sequence, an air source was connected to the packed column with air flow being controlled and the exit gas stream being metered. Said exit gas stream was also fed to a gas chromotograph for composition analysis. Air flow was continued until the methane proportion in the exit gas stream became negligible. The total methane volume being recovered during five (5) air flush test runs is plotted in FIG. 2 as a function of time. The further Table given below lists the methane volume values (V/V) recovered for each of said test runs upon carrying out the overall sequential desorptton procedure are given together with methane volume values for the supplemental air flush step.

TABLE

| Run | Desorption Flow Rate (CC/min) | Methane Recovery Initial Volume (V/V) | Supplemental Volume (V/V) |
|-----|-----|-----|-----|
| A | 126 | 133.4 | 17.0 |
| B | 88 | 118.5 | 18.5 |
| C | 74 | 118.0 | 17.8 |
| D | 80 | 117.2 | 17.8 |
| E | 100 | 118.5 | 18.4 |

As can be seen from the methane removal values reported in said Table, an enhancement of the storage capacity averaging almost 15% can be realized by adopting the herein disclosed means of the present invention.

It will be apparent from the foregoing description that broadly useful and novel means have ben provided to more effectively utilize the stored fuel of an on-board gaseous hydrocarbon fuel powered vehicle system. It will also be apparent that significant further modification can be made in the particular equipment means being employed to recover the stored fuel as well as in the selection of the hydrocarbon fuel and the sorbent material to be employed other than herein specifically illustrated without departing from the true spirit and scope of the present invention. Likewise, modifications other than herein illustrated can be employed in carrying out the method of operating the present utilization system to include both temperature and pressure variation as well as varying operating steps dependent upon the particular equipment means being selected to carry out the operating procedure. Consequently, it is intended to limit the present invention only by the scope of the appended claims.

What we claim as new and desire to secure by Letters Patent of the United States is:

1. An improved utilization system for internal combustion engine vehicles employing a gaseous hydrocarbon as the motive fuel which comprises:
   (a) vehicle storage means comprising a plurality of storage vessels in which the gaseous hydrocarbon fuel is sorbed at above atmospheric pressure in a sorbent material, each of the storage vessels including separate air and fuel passage means,
   (b) manifold means to receive fuel from the individual storage vessels while also conveying a mixture of fuel and air to the vehicle engine, the manifold means further including means to adjust the proportions of fuel and air in the conveyed mixture,
   (c) first conduit means supplying air to the manifold means during vehicle operation, the first conduit means including adjustable valve means to regulate the air volume supplied thereto,
   (d) second conduit means interconnecting the first conduit means and the air passage means provided to each storage vessel, the second conduit means including valve means enabling admission of air to each storage vessel when the internal gas pressure has been reduced by fuel removal therefrom to substantially ambient pressure, and
   (e) third conduit means interconnecting the fuel passage means of each storage vessel and the manifold means, the third conduit means also including valve means enabling fuel removal from each storage vessel.

2. The utilization system of claim 1 wherein the fuel and air mixture being conveyed from the manifold means is supplied directly to the vehicle engine.

3. The utilization system of claim 1 which further includes fuel inlet means connected to the vehicle manifold means.

4. The utilization of claim 3 wherein the third conduit means employs reversible-flow valve means.

5. The utilization system of claim 1 wherein pressure sensitive proportional control valve means are employed to adjust the relative proportions of air and fuel in said manifold means.

6. The utilization system of claim 1 wherein pressure sensitive proportional control valve means are employed in the first conduit means.

7. The utilization system of claim 6 wherein said valve means varies the air volume being supplied to the manifold means.

8. The utilization system of claim 1 wherein air being supplied directly to the manifold means is suspended during the time period when air is being admitted to a storage vessel.

9. The utilization system of claim 1 wherein the valve means employed in both second and third conduit means are fast responsive open and close valves.

10. The utilization system of claim 1 wherein pressure sensitive proportional control valve means are employed in the manifold means as well as the first conduit means, said valve means further being operatively associated to cooperate in adjusting the relative proportions of air and fuel in supplying a mixture to the vehicle engine.

11. An improved utilization system for internal combustion engine vehicles employing a gaseous hydrocarbon as the motive fuel which comprises:
   (a) vehicle storage means comprising a plurality of operatively associated storage cylinders in which the gaseous hydrocarbon fuel is sorbed at above atmospheric pressure in a sorbent material, each of the storage cylinders including separate air and fuel passage means with the air passage means to each storage cylinder being connected to a common air supply,
   (b) manifold means to receive fuel from the individual storage cylinders while also conveying a premixture of fuel and air to the vehicle engine, the manifold means further including first pressure sensitive proportional control valve means to adjust the proportions of fuel and air being supplied in said premixture,
   (c) first conduit means interconnecting the common air supply with the individual storage cylinders and the manifold means, the first conduit means further including second pressure sensitive proportional control valve means which cooperate with the first pressure sensitive proportional control valve means in adjusting the relative proportions of air and fuel in the premixture being supplied to the vehicle engine during operation,
   (d) second conduit means connecting the first conduit means in a sequential manner to each air passage means of the individual storage cylinders, the conduit means having a separate conduit to each storage cylinder which includes a fast response open and close valve means, and
   (e) third conduit means separately connecting the fuel passage means of each storage cylinder to the manifold means, the conduit means also having a separate conduit enabling fuel removal from each storage cylinder in a sequential manner by actuation of fast response open and close valve means incorporated therein.

12. A method to operate an internal combustion engine vehicle with an on-board supply of gaseous hydrocarbon as the motive fuel which comprises:
   (a) storing the gaseous hydrocarbon fuel in a storage means of the vehicle having a plurality of storage vessels, the fuel being stored at above atmospheric pressure in a sorbent material, and with each of the storage vessels having separate air and fuel passage means,
   (b) removing fuel from the storage vessels in a sequential manner for combination with air to provide a predetermined mixture,
   (c) supplying the fuel and air premixture to the vehicle engine,
   (d) subsequently admitting air to each storage vessel when the internal gas pressure has been reduced by fuel removal therefrom to a lower storage pressure, and
   (e) combining fuel and air mixture when removed from the selected storage vessel with the premixture being supplied to the vehicle engine.

13. The method of claim 12 wherein the proportions of fuel and air in the premixture is regulated with pressure sensitive proportional control valve means.

14. The method of claim 12 wherein the vehicle storage means further includes manifold means to receive the fuel from the individual storage vessels.

15. The method of claim 14 wherein the storage vessels and manifold means are interconnected by conduit means.

16. The method of claim 15 wherein the premixture being conveyed from the manifold means is supplied directly to the vehicle engine.

17. The method of claim 14 wherein fuel is also admitted to the manifold means from a pressurized supply source for admission to the individual vehicle storage vessels.

18. The method of claim 15 wherein conduit means connected to the air passage means of individual storage vessels enable air passage with fast response open and close valve means.

19. The method of claim 15 wherein conduit means connected to the fuel passage means of individual storage vessels enable fuel passage with fast response open and close valve means.

20. The method of claim 14 wherein conduit means connecting the manifold means to an air supply include pressure sensitive proportional control valve means.

* * * * *